United States Patent

Kieser et al.

[11] Patent Number: 5,094,575
[45] Date of Patent: Mar. 10, 1992

[54] DEVICE FOR THE FINE ADJUSTMENT OF THE CUTTING DEPTH OF A SURFACE MILLING CUTTER

[75] Inventors: Herman Kieser; Walter Penka, both of Nurtingen, Fed. Rep. of Germany

[73] Assignee: Metabowerke GmbH & Co., Nurtingen, Fed. Rep. of Germany

[21] Appl. No.: 670,755

[22] Filed: Mar. 15, 1991

[30] Foreign Application Priority Data

Mar. 15, 1990 [DE] Fed. Rep. of Germany ....... 4008224

[51] Int. Cl.$^5$ .............................. B23C 1/20; B27C 5/10
[52] U.S. Cl. ............................... 409/182; 144/134 D
[58] Field of Search ......................... 409/182, 218, 184; 144/134 A, 136 C, 134 D

[56] References Cited

U.S. PATENT DOCUMENTS

| | | | |
|---|---|---|---|
| 4,562,872 | 1/1986 | Fushiya et al. | 144/134 D |
| 4,566,830 | 1/1986 | Maier et al. | 409/182 |
| 4,652,191 | 3/1987 | Bernier | 409/182 |
| 4,770,573 | 9/1988 | Monobe | 409/182 |
| 4,938,264 | 7/1990 | Ferenczffy | 144/134 D |
| 4,938,642 | 7/1990 | Imahashi | 409/182 |

FOREIGN PATENT DOCUMENTS 1048011 10/1955 Fed. Rep. of Germany .
1820029 10/1960 Fed. Rep. of Germany .
8318460 6/1983 Fed. Rep. of Germany .

Primary Examiner—William Briggs
Attorney, Agent, or Firm—Jones, Tullar & Cooper

[57] ABSTRACT

A device for the fine adjustment of the cutting depth of a surface milling cutter, where a cutter holder supporting a drive and a cutting head is displaceable with respect to a foot plate along guide columns which extend vertically to the foot plate and are supported therein. The cutter holder is fixable in a first, rough vertical distance position (cutting depth) by means of at least one locking element, with a threaded spindle, which is preferably adjustable parallel to the guide columns. The cutter holder has a stop face, which cooperates with a bit stop, fastened to be adjustable in height on the foot plate, so that a fine height adjustment is possible when the locking element(s) is (are) released. In order to decrease the amount of time and adjustment effort for setting a desired cutting depth by means of the fine height adjustment, it is provided that the spindle guide is disposed in a spindle guide housing, and that this spindle guide housing is placed in a sliding guide so that it can be displaced parallel to the guide columns and can be fixed with respect to the cutter holder at different vertical distances by means of a clamping device.

59 Claims, 5 Drawing Sheets

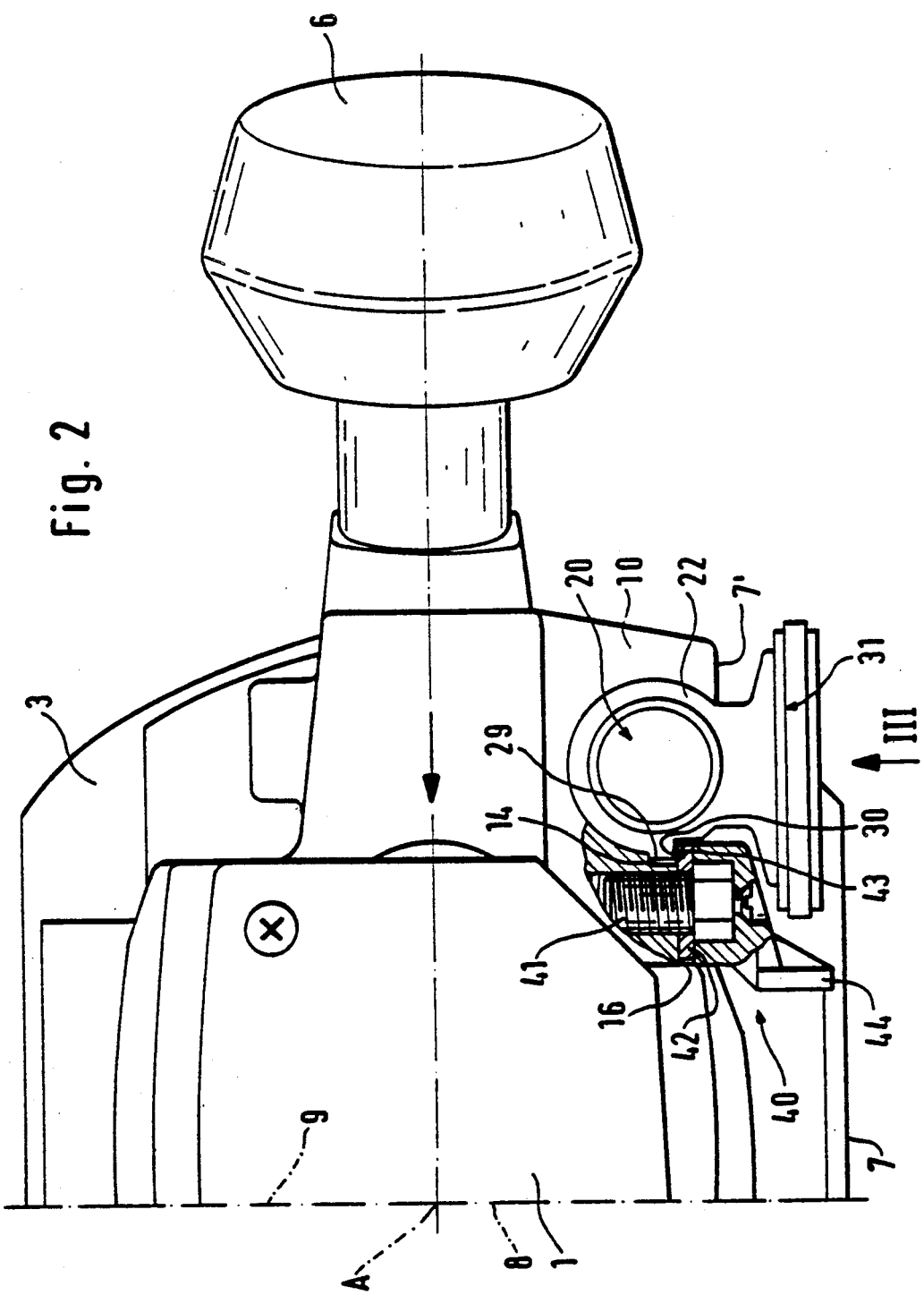

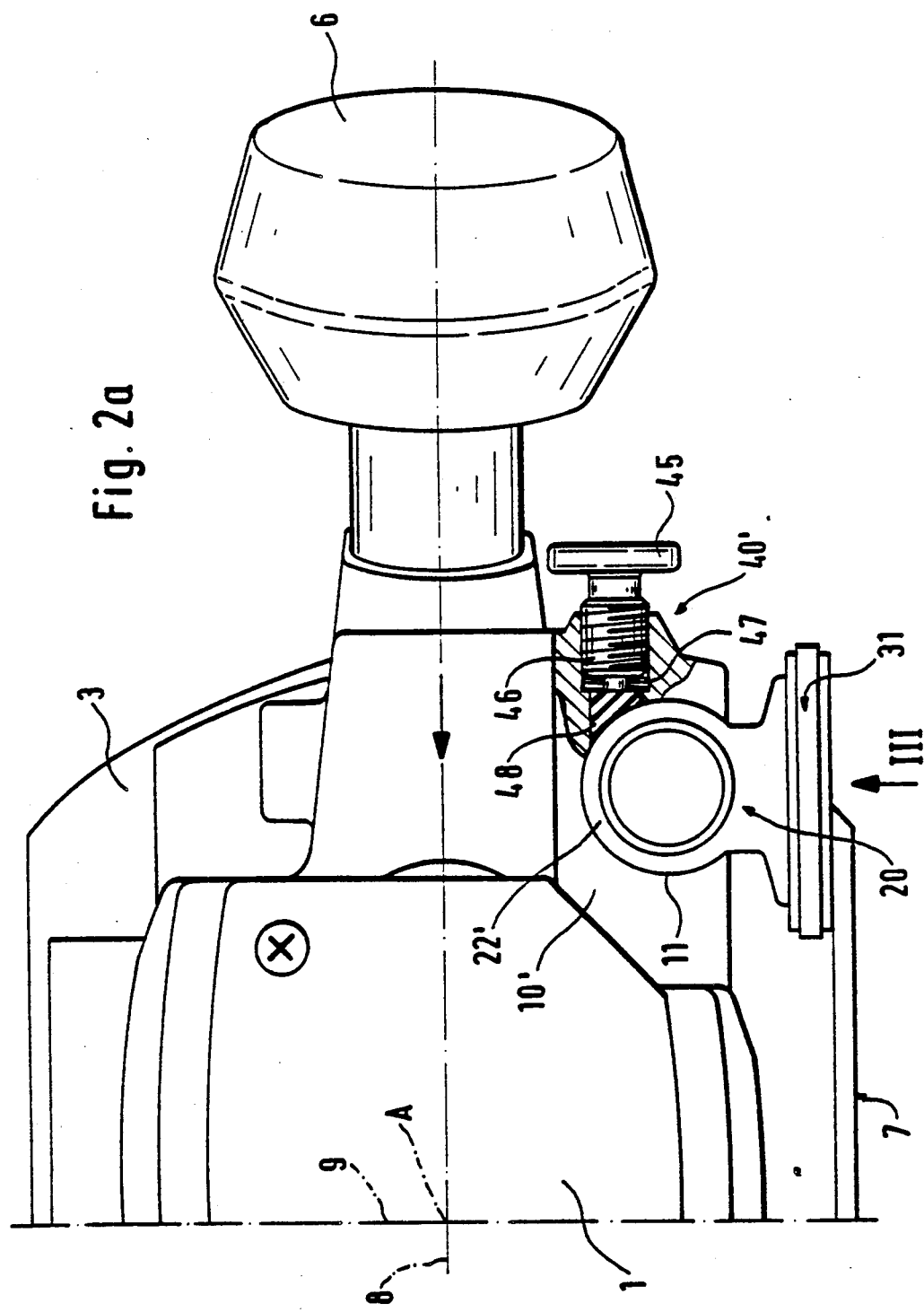

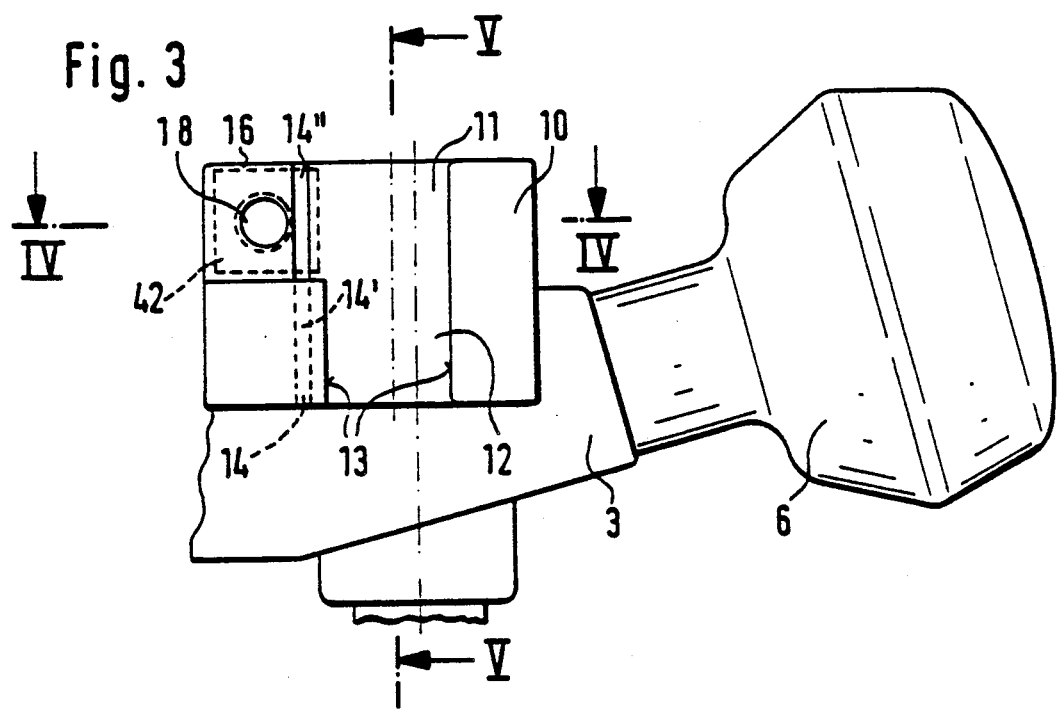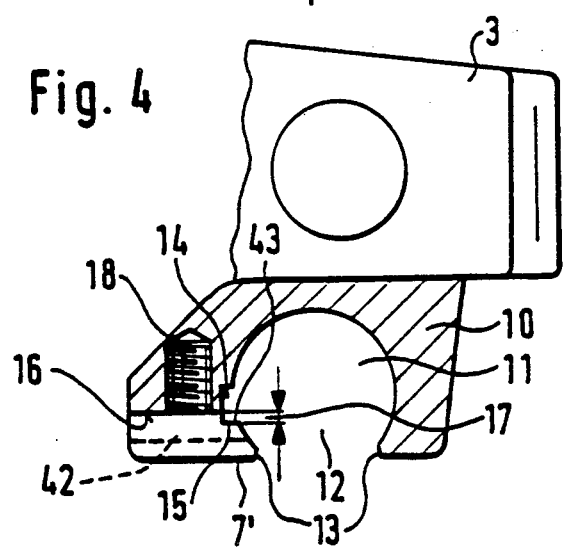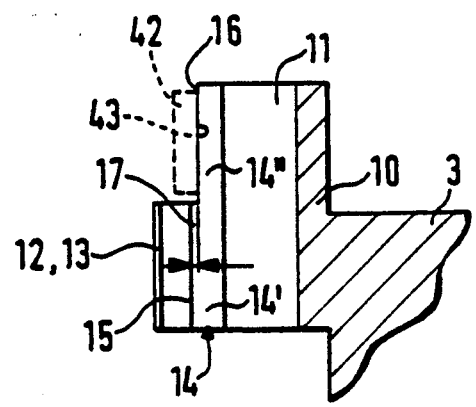

5,094,575

DEVICE FOR THE FINE ADJUSTMENT OF THE CUTTING DEPTH OF A SURFACE MILLING CUTTER

FIELD OF THE INVENTION

The invention relates to a device for the fine adjustment of the cutting depth of a surface milling cutter, and in particular to a cutter holder supporting a drive and a cutting head which is displaceable with respect to a foot plate along guide columns which extend vertically to the foot plate and are supported therein. The holder is fixable in a first, rough vertical distance position (cutting depth) by means of at least one locking element, with a threaded spindle, which is preferably adjustable parallel to the guide columns of a spindle guide provided on the cutter holder and has a stop face on the bottom, which cooperates with a bit stop, fastened adjustably in height on the foot plate, so that a fine height adjustment is possible when the locking element(s) is (are) released.

BACKGROUND OF THE INVENTION

A milling cutter with such a device is known from German Published, Non-examined Patent Application DE-OS 33 14 419. For setting a given cutting depth, the cutter holder is displaced with respect to the foot plate in a first step and is fixed in a first, rough vertical position by means of the locking elements, which cooperate in a frictionally engaged manner with the guide columns. For fine adjustment, the threaded spindle, which is supported in a spindle guide fixedly connected with the cutting holder, is axially displaced by means of a setting wheel and with its front contact face is brought in contact with a stop element in the form of an adjustment screw of a turret bit stop. A floating attachment is disposed at the end of the threaded spindle, which grips the head of the adjustment screw from behind by means of a claw. Because of this it is possible to connect the cutter holder releasably with the foot plate. After the floating attachment has been swivelled into the locked position and the locking elements on the cutter holder have been undone, fine adjustment of the cutting depth is made possible by rotating the setting wheel. The amount of adjustment can be read off a scale, which is fixedly connected with the foot plate and guided on the cutter holder. The fine adjustment device formed in this way has a number of disadvantages. The distance between the foot plate and the cutter holder is particularly large at small cutting depths. In order to make a fine adjustment of the cutting depth, it is necessary either to screw out the adjustment screw of the bit stop by means of a screwdriver or the like far enough, so that it ends up in the area of the lower end of the spindle and in this way makes possible an engagement with the front face by turning of the setting wheel; or the setting wheel must be operated until the lower end of the spindle extends far enough from the cutter holder so that the connection with the adjustment screw becomes possible. In either case this entails a considerable expenditure of time and adjustment efforts.

A further disadvantage of the device for the fine adjustment of the cutting depth in accordance with German Published, Non-examined Patent Application DE-OS 33 14 419 consists in that a change of the vertical distance between the foot plate and the cutter holder can only be roughly read off the scale when the threaded spindle is operated, so that the adjustment of the cutting depth is very imprecise.

SUMMARY OF THE INVENTION

It is therefore an object of the invention to provide a device for the fine adjustment of the milling depth of the previously mentioned type, in which the expenditure of time and adjustment efforts for setting a desired milling depth is reduced by means of fine height adjustment. The device should furthermore be constructed as simply as possible so that simple assembly and easy operation are possible.

This object is attained in accordance with the invention in that the spindle guide is disposed in a spindle guide housing, and in that this spindle guide housing is placed in a sliding guide so that it can be displaced parallel to the guide columns and can be fixed with respect to the cutter holder at different vertical distances by means of a clamping device. Thus rapid adjustment of the entire spindle in the direction of the bit stop by means of the longitudinal displacement and locking of the spindle guide housing is made possible. Subsequently, the final fine adjustment of the vertical distance position (cutting depth) is performed by turning the setting element.

The problem of the imprecise feed-in of the cutting depth referred to above is solved in a further embodiment of the invention in that the spindle guide housing has a distance indicator device for indicating the axial displacement position of the threaded spindle within the spindle guide housing. In this case the distance indicator may be a digital or analog dial gauge cooperating in a suitable manner with the threaded spindle, so that its every change is directly displayed and a precise and monitored feed-in of the cutting depth can be performed in this way. Additionally, the spindle guide housing may have a measuring scale for determining the vertical distance position in relation to the cutter holder.

It is of importance for ease of operation of such a fine adjustment device that the spindle guide is disposed in a spindle guide housing, and that the spindle guide housing with the distance indicator device as well as the clamping device are disposed on the cutter holder, in particular on its front, in such a way that they are easily visible and accessible to the operator.

A particularly simple structural embodiment provides for the spindle guide housing to be guided for axial displacement and to be lockable, but secure against twisting, in an integrally formed or separately fixed housing receptacle on the front of the cutter holder at the side of the drive. Rotation-hampering guidance can be attained in a simple way by providing the housing receptacle with a receiving channel, which at least partially encloses the spindle guide housing, which may have a guide slit, preferably open towards the front, and/or a clamping guide groove, in which the spindle guide housing is guided. The latter itself may have a guide protrusion extending over its length and/or a clamping tongue, which is adapted to the cross section of the guide slit or the clamping guide groove. The guide is preferably in the form of a fitted guide.

It is particularly advantageous for preventing soiling of and damage to the threaded spindle during operation of the surface milling cutter, for the spindle guide housing to have a basic body in the shape of a hollow cylinder, in which the threaded spindle is preferably concentrically contained and rotatably seated in an inner thread designed in accordance with the lead of the threaded spindle.

It may be further provided for the spindle guide housing to have a cutout, which is preferably centered on the basic body and crosswise to the longitudinal axis of the spindle, around which a housing of the distance indicator device, formed integrally on the outer, upper surface of the basic body, is developed and which is disposed, to extend through the guide slit, outside of the receiving channel. In this connection the particular shape of the housing of the distance indicator device is preferably selected in such a way that it is possible, for example, to receive and fix the faces or electronic displays of standard dial gauges or those produced on a production line. The transition zone between the basic body and the housing of the distance indicator device may be formed by the guide protrusion in such a way that free sliding of the spindle guide housing in the receiving channel is assured.

It is advantageous for the threaded spindle to have a lower end in the shape of a stop pin, the length of which corresponds at least to the maximum feed distance of the threaded spindle in the spindle guide housing, so that no portion of the thread extends out of the spindle guide housing in any position of the threaded spindle inside it, which in case of soiling might impair the spindle engagement and thus the feed.

It is particularly advantageous for connecting the distance indicator device with the threaded spindle, if the latter has an electro-magnetic or mechanical measured-value transmitter, formed in particular by an area of the shaft of the threaded spindle which is provided with annular grooves, which cooperates with a measured-value receiver of the distance indicator device, in particular with an axially displaceable fork, by means of which an indication is provided simultaneously with the displacement of the threaded spindle within the spindle guide housing, as well as the monitoring of the amount of feed.

For quick and simple fine height adjustment it is particularly advantageous for the threaded spindle to have an adjustment element in its upper area, in particular a knurled knob extending from the upper front surface of the spindle guide housing, by the turning of which the threaded spindle can be axially advanced. The disposition of the knurled knob on the front surface makes it possible to design the spindle guide housing as well as the threaded spindle in a structurally simple way, while the knurling assures a sure grip when adjusting the threaded spindle.

To provide secure and quickly releasable locking of the spindle guide housing in the receiving channel, it is particularly advantageous, if the clamping device has a rotatable locking knob, in particular in the shape of a T-screw, the threaded shaft of which is received in a threaded bore, which preferably extends vertically to the longitudinal axis of the spindle and extends through the wall of the housing receptacle into the receiving channel. Its front end has a preferably resilient friction element which, by turning of the locking knob, can be brought into or out of frictional engagement with the spindle guide housing, so that the latter is clamped in the housing receptacle or slidable therein. The clamping device provided in this manner is structurally particularly simple and is similar to the one used for locking the cutter holder on the guide columns.

In another advantageous embodiment of the clamping device it is provided that the clamping tongue is disposed angularly displaced with respect to the guide protrusion, has a clamping counter-surface extending parallel to the front face and is fittedly guided in the clamping guide groove and can be clamped in it by means of a clamping screw which acts directly or with the interposition of a clamping element on the clamping counter-surface. In this case the engagement of the clamping screw can take place either with the front end of the threaded shaft, or with the screw head or by means of a clamping element separately disposed between the screw head and the clamping tongue. To achieve as space-saving a disposition as possible of the clamping device in the housing receptacle, as well as to obtain effective clamping of the clamping tongue in the clamping guide groove, it is advantageous to screw the clamping screw into a fastening bore extending vertically to the front face, which is provided at the side of the clamping guide groove in a contact surface offset back from the front side of the housing receptacle and parallel to it. The contact surface is disposed offset back from the edge of the clamping guide groove located nearest to it on the front face in such a way, that the clamping counter-surface of the clamping tongue located in the clamping guide groove extends from the contact surface by an appropriate clamping distance and that a clamping surface, formed on the underside of the head of the clamping screw or on the interposed clamping element can, by turning of the clamping screw, be brought in or out of an engagement, which clamps or releases the clamping tongue in the clamping guide groove. In the case of a rectangular clamping guide groove, the contact surface forms a step with the bottom of the clamping guide groove and is offset backwards with respect to the wall of the clamping groove located next on the front surface by a small clamping distance, for example 0.1 mm. In this case a clamping disk can be provided as clamping element, on which the clamping surface is formed which, however, is removably fastened on the contact surface by means of the clamping screw extending through a bore. To a large extent this clamping surface replaces the wall of the clamping guide groove, which is not provided in the area of the contact surface. By means of this guidance of the clamping tongue by the clamping disk in this area of the clamping guide groove, the largest possible frictional contact surface is formed, which assures secure clamping.

To permit easy manual operation of the clamping screw, it is particularly advantageous if it has a clamping lever which is either integrally made of one piece with it or is separately attached to it in a form-fitting manner, by means of which it is possible to quickly release or tighten the clamping device for adjusting or locking the spindle guide housing without the need for additional tools.

The lead of the thread can be selected in such a way, that the clamping screw can be brought into a clamping position by rotating it half a turn, or out of it by another half turn into a position which assures the displacement of the spindle guide housing in the housing receptacle. With a very small clamping distance, the lead of the thread of the clamping screw can correspond to twice the clamping distance.

Advantageous improvements of the invention ensue from the dependent claims and from an exemplary embodiment of the invention, which will be described in detail below by referring to the attached drawings.

BRIEF DESCRIPTION OF THE DRAWINGS

FIG. 2 is a partial top view of the surface milling cutter in accordance with FIG. 1 in the direction of the arrow II with a partially made cut in the area of the clamping device of the device for the fine adjustment of the cutting depth, FIG. 2a is a partial top view of the surface milling cutter shown in FIG. 1 in accordance with the arrow II, with a clamping device different from that of FIG. 2, FIG. 3 is a partial view of the cutter holder of the surface milling cutter in accordance with FIG. 2 in the direction of the arrow III, in which the structure of the housing receptacle for the spindle guide device of the device for the fine adjustment of the cutting depth is shown, FIG. 4 is a cross-sectional view along the line IV—IV of the housing receptacle at the cutter holder shown in FIG. 3, FIG. 5 is a longitudinal section along the line V—V of the housing receptacle at the cutter holder shown in FIG. 3.

DETAILED DESCRIPTION OF THE PREFERRED EMBODIMENTS

Figure 1:
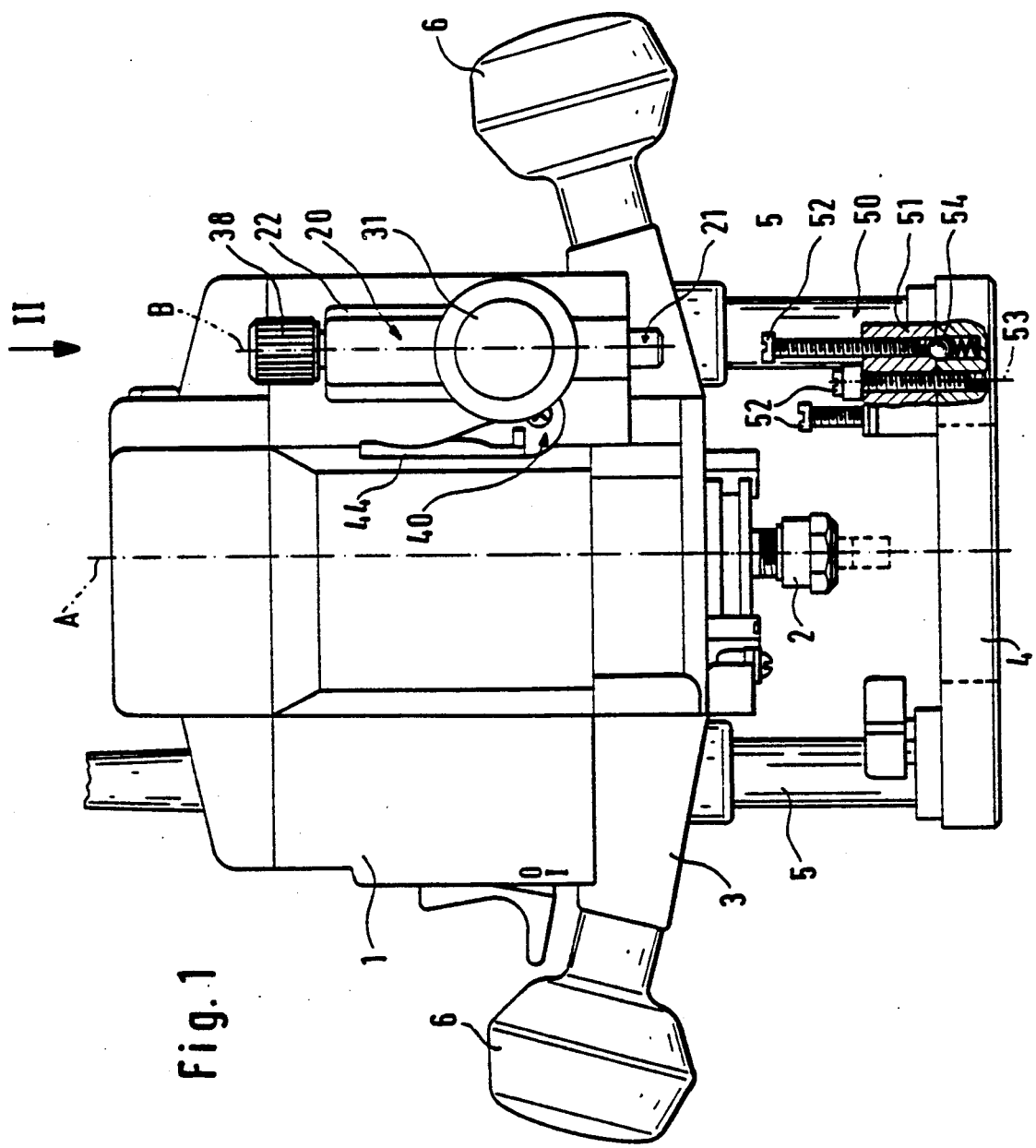
FIG. 1 is a front view of a surface milling cutter with a device for the fine adjustment of the cutting depth.
Figure 6:
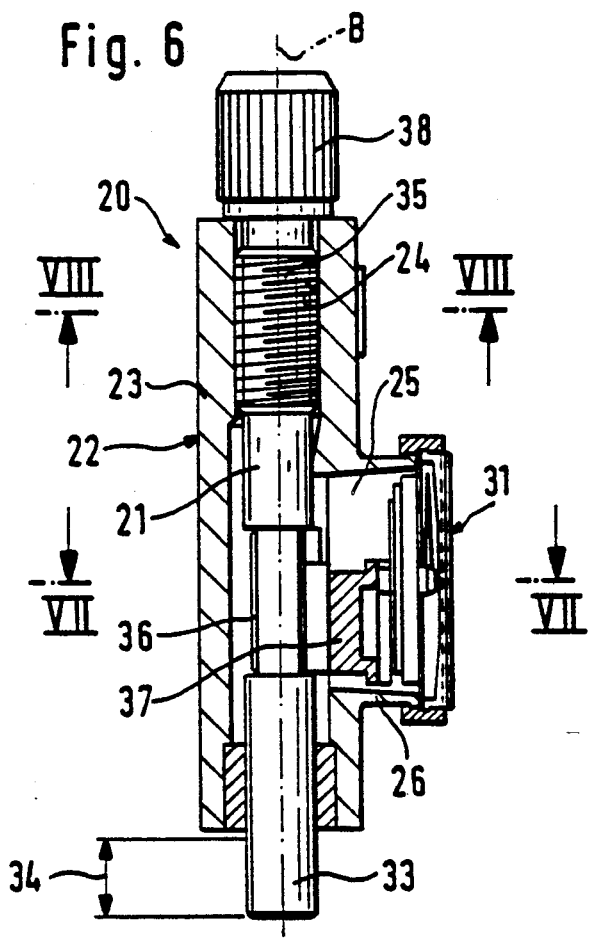
FIG. 6 is a longitudinal section of the spindle guide housing of the spindle guide of the device for the fine adjustment of the cutting depth of FIG. 1 with the threaded spindle inserted therein.
Figure 9:
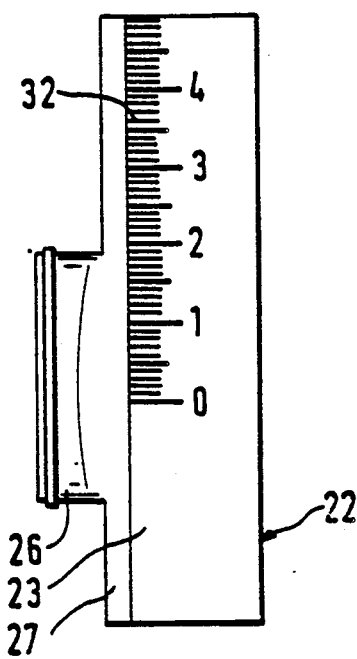
FIG. 9 is a lateral view of the spindle guide housing.
Figure 7:
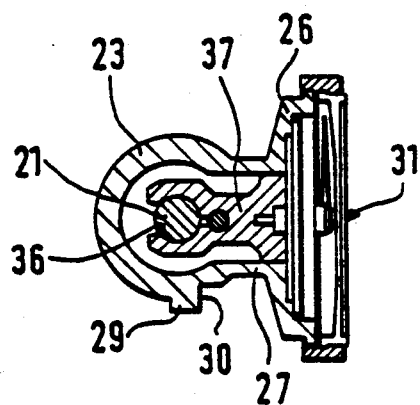
FIG. 7 is a cross-sectional view along the line VII—VII of the threaded spindle guide shown in FIG. 6.
Figure 8:
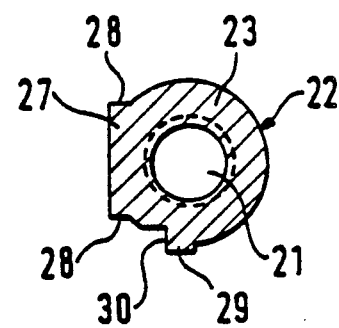
FIG. 8 is a cross-sectional view along the line VIII—VIII of the threaded spindle guide shown in FIG. 6.

The surface milling cutter in accordance with FIGS. 1, 2 and 2a essentially consists of a cutter holder 3 which is displaceable in the direction of an axis A with respect to a foot plate 4, a pair of guide columns 5, extending vertically to the foot plate 4 and mounted in it preferably symmetrically to the axis A at a distance from each other which engage fitted bores, not shown, of the cutter holder 3. Two locking elements 6 with handles are provided, which are rotatably and axially movably disposed on the cutter holder 3 by means of locking screws, not shown, and which, when appropriately actuated, press a preferably resilient friction element, not shown, against the guide columns 5 or move it away from them, as a result of which the cutting depth, determined by the vertical distance position, is continuously variable and the cutter holder 3 can be locked in varied vertical distance positions with respect to the foot plate 4, and a motor-operated drive 1, with a drive shaft downwardly extending through the cutter holder 3, on which a cutter head 2 is mounted, in which different cutting tools, indicated by dashed lines in FIG. 1, can be clamped.

The device for the fine adjustment of the cutting depth is located on the front face 7 of the cutter holder 3 and is disposed at a distance in relation to one of the guide columns 5 as well as to the cutter head 2, as shown in FIGS. 1 and 2, in such a way, that easy operation and access are assured. It has a spindle guide 20, in which a threaded spindle 21 is disposed, which is rotatably seated, but axially displaceable and lockable. The spindle guide 20 is placed in a spindle guide housing 22, which is contained in a sliding guide 10, 11 of the cutter holder 3, displaceable parallel to the guide columns 5, and which can be locked at various vertical distance positions with respect to the cutter holder 3 by means of a clamping device 40, 40'. Thus, the entire spindle guide 20 can be advanced in the direction of the foot plate 4 with respect to the cutter holder 3, even when the cutter holder 3 has been locked in place in a given vertical distance position by means of the locking elements 6.

The spindle guide 20 is shown in more detail in FIGS. 6 to 9. The spindle guide housing 22 has a basic body 23 in the shape of a hollow cylinder, in which the threaded spindle 21 is contained concentrically to the longitudinal axis B of the spindle guide housing and is rotatably seated and thus axially displaceable in an inner thread 24 of the basic body 23, which is designed to correspond with the lead of the threaded spindle of an upper feed thread area 35 of the threaded spindle 21. The lower end of the threaded spindle 21 is in the form of a stop pin 33, which extends through the lower front face of the basic body 23, dependinq on the position of the feed thread 35 in the inner thread 24. The length of the stop pin 33 has been selected to be such that it corresponds at least to a maximum feed distance 34, which is determined by the maximum displacement distance of the threaded spindle 21 in the spindle guide housing 22 and which should be at least 10 mm. In the exemplary embodiment the thread lead of the feed thread area 35 is 1 mm, but may also be chosen to be less or more. The threaded spindle 21 has in its upper area a knurled knob 38 for easier operation and axial feeding, which extends out of the upper front face of the basic body 23. Between the feed thread area 35 and the stop pin 33, the threaded spindle 21 has a number of annular grooves 36, in the shape of a rack wound around the shaft area, so to speak, the purpose of which will later be discussed below.

So as to monitor the displacement path of the threaded spindle 21 within the spindle guide housing 22 directly, a distance indicator device 31 in the form of an analog mechanical dial gauge is provided, which is contained in a distance indicator device housing 26, formed integrally with the basic body 23. This has been formed on the outer surface of the basic body approximately centered on the basic body 23 around a cutout 25 extending crosswise to the longitudinal axis B of the spindle guide housing. The exterior form of the housing 26 depends on the type of distance indicator device used and is disk-shaped in the present exemplary embodiment, because a round instrument was built in. A fork 37, which engages the grooves 36 and is displaceable parallel to the axis B, is provided between the dial gauge and the threaded spindle 21, i.e. it is connected axially displaceable with the threaded spindle 21 and, when the threaded spindle 21 rotates, it transfers its axial displacement to the dial gauge, where it is transformed into the movement of a pointer. In the case where electrically or inductively operated distance indicator devices are employed, it is possible to connect other, appropriate electro-magnetic or mechanical measured-value transmitters with the threaded spindle 21, which cooperate with a respective measured-value receiver of the distance indicator device 31. Various distance indicator devices are known to one skilled in the art.

As shown in FIG. 2 and particularly in FIGS. 3 to 5, in the illustrated embodiment the sliding guide 10, 11 is formed by a housing receptacle 10, which is laterally offset (adjacent) with respect to the transverse center plane 8 and offset (out of) the longitudinal center plane 9. The housing receptacle 10 is oriented towards the front face 7 of the cutter holder 3 and is preferably integrally formed on the cutter holder 3. The housing receptacle 10 has a receiving channel, or bore 11, open towards the front face 7 through a guide slit 12. The channel 11 at least partially encloses the spindle guide housing 22 in a cross-sectionally corresponding manner. The housing receptacle 10 may also be a separate component, which is fastened in a suitable manner on the cutter holder 3. The spindle guide housing 22 is guided in the housing receptacle 10 axially fixable and secure against rotation.

The spindle guide housing 22 has a guide protrusion 27 (FIG. 8), which extends over its length, is rectangular in cross section, is adapted to correspond to the cross section of the guide slit 12 and can be received, resting with its lateral protrusion guide surfaces 28 between the guide surfaces 13 (FIG. 4) of the opposite edges of the guide slit 12, so that a close fit is achieved. In this case the housing 26 of the distance indicator device is disposed in the radial extension of the guide protrusion 27 (FIG. 7), so that it is disposed to be easily visible on the front face 7 outside of the receiver channel 11 and does not hamper the displacement of the spindle guide housing 22. In a first exemplary embodiment of the design of a clamping device 40, the spindle guide housing 22 (FIGS. 2, 6 to 8) has a clamping tongue 29, extending parallel to the longitudinal axis B of the spindle guide housing and integrally formed on the outside over the entire length of the housing. It has a rectangular cross section, is disposed at an angle of 90° in relation to the guide protrusion 27 and has a clamping counter-surface 30 oriented towards the front face 7. The clamping tongue 29 is contained in a clamping guide groove 14, formed in the housing receptacle 10 in a cross-sectionally corresponding manner In FIGS. 3 to 5 the housing receptacle 10 is shown without the spindle guide housing 22 contained therein in order to make the design of the clamping guide groove 14 clear. The clamping guide groove 14 is open in the direction of the receiving channel 11, with the bottom of the clamping guide groove 14 extending parallel to the feed direction of the cutter holder 3. In this embodiment the clamping tongue 29 prevents rotation of the spindle guide housing 22, so that it is possible to do without the guide protrusion 27 to prevent rotation.

A contact surface 16 is formed at the side of the clamping guide groove 14 in the upper area of the housing receptacle 10 and is offset back from its front face 7', which is disposed offset back in relation to the clamping guide edge 15 located next on the front face in such a way, that the clamping counter-surface 30, not shown in FIG. 4, of the clamping tongue 29 seated in the clamping guide groove 14 protrudes by the amount of an appropriate clamping distance 17 with respect to the contact surface 16. The contact surface 16 forms a step at 90° with the bottom of the clamping guide groove, so that, in contrast with the lower area of the clamping guide groove 14, in this area the groove wall closest to the front face is lacking. As indicated by dashed lines in FIGS. 3 to 5 and clearly visible in FIG. 2, a preferably rectangular clamping disk 42 is disposed on the contact surface 16, which is removably fastened on the contact surface 16 and which extends into the receiver channel 11 with a clamping surface 43 oriented towards the contact surface 16 far enough that it replaces to the greatest extent the lacking front facing groove wall in the area of the contact surface 16. In this way the clamping guide groove 14 is divided into an upper clamping area 14″ and a lower guide area 14′. When resting on the contact surface 16, the width of the clamping guide groove is less, because of the clamping distance 17 in the clamping area 14″ of the clamping disk 42, than in the guide area 14′, so that a satisfactory clamping effect is attained when the clamping disk 42 is pressed against the clamping tongue 29. Also, sufficient release of the clamping effect and guidance of the clamping tongue 29 is assured when the clamping disk 42 is lifted from the contact surface 16 by the clamping distance 17.

To clamp the clamping tongue 29 in the clamping guide groove 14, a clamping screw 41 is provided, which extends through a bore of the clamping disk 42 and is screwed into a fastening bore 18, extending vertically to the front face 7' and provided at the side of the clamping guide groove 14 in the contact surface 16 (FIGS. 2, 3, 4). Because of the clamping distance 17, it is now possible to clamp the clamping tongue 29 in the clamping guide groove 14 by turning the clamping screw 41. In this case the clamping surface 43 is brought into or out of frictional engagement with the clamping counter-surface 30 of the clamping tongue 29. It is also conceivable to omit the clamping disk 42 and to design the screw head of the clamping screw 41 in such a way, that the clamping surface 43 is formed on its underside and directly cooperates with the clamping counter-surface 30 in this way.

As shown in FIGS. 1 and 2, the clamping screw 41 has a clamping lever 44, which can be either integrally made of one piece with the screw head or is separately attached to it in a form-fitting manner. By means of this a quick release or tightening of the clamping device for adjusting or locking the spindle guide housing 22 is possible. The clamping lever 44 is shown in FIG. 1 in a position in which the spindle guide housing 22 is clamped. If the clamping lever 44 is pivoted by 180° counterclockwise, it is in a position which assures the displacement of the spindle guide housing 22 in the housing receptacle 10. Therefore the thread lead of the clamping screw 41 is laid out in such a way, that the clamping effect is achieved or cancelled by one-half of a turn. If the clamping distance 17 is sufficiently small, for example in the range of tenths of a millimeter, the thread lead can be approximately twice as large as it.

Another embodiment of a clamping device 40′ is shown in FIG. 2a. In contrast to the housing receptacle 10 in accordance with FIG. 2, the housing receptacle 10′ provided there has neither a clamping guide groove 14 nor a contact surface 16. Accordingly, the spindle guide housing 22′ is without a clamping tongue 29, and in this case the guide protrusion 27 provides the security against rotation in the housing receptacle 10′. The clamping device 40′ has a rotatable locking knob 45, the head of which has the particular shape of a T-screw, and the threaded shaft 46 is located in a threaded bore 47, which preferably extends vertically to the longitudinal axis B of the spindle guide housing and extends through the wall of the housing receptacle into the receiver channel 11. On its front end the threaded shaft 46 has a resilient friction element 48, which can be brought into or out of frictional contact with the spindle guide housing 22′ by turning 45. By means of this it can be clamped in the housing receptacle 10′ or can be freely displaced. The clamping device 40′ formed in this way is particularly simple and is similar to the one used for locking the cutter holder 3 to the guide columns 5 by means of the locking elements 6.

As also shown in FIG. 1, the foot plate 4 has a turret bit stop 50 for pre-selecting different cutting depths, which has three stop screws 52 supported by a turret plate 51. The turret plate 51 is rotatable on an axle bolt 53 and mounted on the foot plate 4, preferably has the shape of a circular disk and can be fixed by means of a resilient catch 54 of the foot plate 4 in positions of rest which are offset in steps. In this way each one of the stop screws 52, disposed on the turret plate 51 offset from each other by the same angle, can be brought into an aligned position in respect to the spindle 21 of the device for the fine adjustment of the cutting depth by the rotation of the turret plate 51 and attainment of the catch position. The stop screws 52 are adjustable in height on the turret plate 51 by turning them in or out. The thread lead is preferably 1 mm and the thread is designed in such a way that no accidental change can occur. Each one of these adjustable vertical distance positions corresponds to a predetermined cutting depth which is set by bringing the associated stop screw 52 into alignment with the spindle 21 and subsequently bringing the stop bolt 33 into contact with the respective stop screw 52 by lowering the cutter holder 3. Thus the reproducibility of three different cutting depths is assured by the turret bit stop 50 without it being required to change the stop screws 52 in respect to their vertical position in relation to the foot plate 4.

Reference is made to FIGS. 1 and 2 for the function of the device for the fine adjustment of the cutting depth. In the position illustrated in FIG. 1, the cutter holder 3 with the cutting tool clamped in the cutter head 2 is fixed with respect to the foot plate 4. By undoing the locking elements 6, the cutter holder 3 can be freely displaced in relation to the foot plate 4 and the cutting depth can be roughly pre-selected, after which the locking elements 6 are again tightened. Subsequently the clamping lever 44 is turned by 180° downward, so that release of the clamping device 40 is accomplished and the entire spindle guide 20 contained in the spindle guide housing 22, can be axially displaced until the stop bolt 33 of the threaded spindle 21 comes into contact with the head of the stop screw 52, which is actually in an aligned position in relation to the threaded spindle 21 and is fixed, secure against twisting in relation to the foot plate 4, in the catch position. Following this, by pivoting the clamping lever 44 into its engaged position the spindle guide housing 22 is again clamped so that it cannot be axially displaced. The amount of displacement of the spindle guide housing 22 in relation to the cutter holder 3 can be determined by means of a scale 32 (FIG. 9) provided on the basic body 23 of the spindle guide housing 22. Following the release of the locking elements 6, the threaded spindle 21 can be arbitrarily displaced by turning the knurled knob 38. Each displacement of the threaded spindle 21 within the spindle guide housing 22 results in an increase or decrease of the vertical distance position of the cutter holder 3 with respect to the foot plate 4, by means of which the cutting depth can be finely regulated and the amount of adjustment can be observed on the dial gauge 31. If the zero mark of the scale of the dial gauge 31 is first correlated with its pointer, each change of the cutting depth can be directly read off with great accuracy.

After fine height adjustment, the device for the fine adjustment of the cutting depth described in this way can also be used as a stop device for the cutter holder 3, which cooperates with the bit stop 50 of the foot plate 4 during penetration cutting operation and limits the maximum penetration depth of the cutting tool into a workpiece to be treated.

What is claimed is:

1. A device for the fine adjustment of the cutting depth of a surface milling cutter, comprising:
   a foot plate;
   a plurality of spaced apart guide columns fixed to and extending from said foot plate;
   a bit stop mounted to said foot plate, said bit stop being vertically adjustable relative to said foot plate;
   a cutter holder vertically displaceable with respect to said foot plate along said guide columns, said cutter holder having a front face and supporting a drive, a cutting head, and a sliding guide;
   spindle guide housing disposed in said sliding guide for displacement relative to said cutter holder;
   a threaded spindle and a stop pin both adjustable in said spindle guide in a direction parallel to said columns, said stop pin cooperating with said bit stop;
   at least one locking element for fixing said cutter holder at a vertical position relative to said columns; and
   a clamping device for fixing said spindle guide housing at different displacements relative to said cutter holder.

2. The device as defined in claim 1, further comprising:
   a distance indicator device mounted to said spindle guide housing for indicating the axial displacement position of the threaded spindle within the spindle guide housing.

3. The device as defined in claim 2, wherein said distance indicator includes a measured-value receiver, and wherein said threaded spindle includes an electromagnetic measured-value transmitter which cooperates with said measured-value receivers.

4. The device as defined in claim 3, wherein said measured-value receiver comprises an axially displaceable fork.

5. The device as defined in claim 2, wherein said distance indicator includes a measured-value receiver, and wherein said threaded spindle includes a mechanical measured-value transmitter which cooperates with said measured-value receiver.

6. The device as defined in claim 5, wherein said measured-value receiver comprises an axially displaceable fork.

7. The device as defined in claim 5, wherein said mechanical measured-value transmitter comprises annular grooves formed on the shaft of said threaded spindle.

8. The device as defined in claim 7, wherein said measured-value receiver comprises an axially displaceable fork.

9. The device as defined in claim 2, wherein the distance indicator device is a digital dial gauge.

10. The device as defined in claim 2, wherein the distance indicator device is an analogue dial gauge.

11. The device as defined in claim 2, wherein said spindle guide housing, said distance indicator device and said clamping device are disposed on the front face of said cutter holder so that they are visible and accessible to an operator.

12. The device as defined in claim 1, wherein said sliding guide comprises a housing receptacle fixed on the front face of said cutter holder and adjacent the drive, and wherein said spindle guide housing is secured against rotation in said housing receptacle, and is lockable and displaceable relative to said housing receptacle.

13. The device as defined in claim 12, wherein said clamping device includes a threaded bore, the front end of which has a friction element, and a rotatable locking knob having a threaded shaft received in said thread bore, and wherein said friction element can be brought into or out of frictional engagement with said spindle guide housing by turning said locking knob so that the spindle guide housing is clamped in said housing receptacle or is slidable therein.

14. The device as defined in claim 13, wherein said rotatable locking knob comprises a T-screw.

15. The device as defined in claim 13, wherein said friction element is resilient.

16. The device as defined in claim 12, wherein said housing receptacle includes a channel which at least partially encloses said spindle guide housing and is open toward the front face of said cutter holder through a guide slit and is also open through a clamping guide groove, wherein said spindle guide housing includes a guide protrusion extending over its length and a clamping tongue which are adapted to the cross section of one of said guide slit and clamping guide groove, wherein said clamping tongue has a clamping counter-surface, wherein said clamping device includes said clamping guide groove, a clamping screw, and a clamping element, and wherein the clamping tongue is angularly disposed with respect to said guide protrusion, said clamping counter-surface extends parallel to said front face and is fittedly guided in the clamping guide groove and can be clamped by means of said clamping screw, said clamping screw acting directly or through the interposition of said clamping element on the clamping counter-surface.

17. The device as defined in claim 16, wherein said sliding guide includes a fastening bore having said clamping screw screwed therein, said fastening bore extends vertically to said front face, provided at one side of the clamping guide groove, and opens in a contact surface offset back from and parallel to said front face, the offset being such that the clamping counter-surface of said clamping tongue defines a clamping distance with respect to said contact surface, and wherein a clamping surface, formed on the underside of the head of said clamping screw or on said interposed clamping element, can be brought in or out of engagement with said clamping counter-surface thereby clamping or releasing said clamping tongue in said clamping guide groove, by turning of said clamping screw.

18. The device as defined in claim 17, wherein said clamping element comprises a clamping disk, said clamping disk being fastened on said contact surface by said clamping screw, and being provided with said clamping surface.

19. The device as defined in claim 16, wherein said clamping device further includes a clamping lever integrally made of one piece with said clamping screw.

20. The device as defined in claim 16, wherein the lead of the thread of said clamping screw is selected such that said clamping screw can be brought into a clamping position by rotating it half a turn, and out of the clamping position, which assures the displacement of said spindle guide housing in said housing receptacle, by rotating it half a turn.

21. The device as defined in claim 12, wherein said housing receptacle includes a channel which at least partially encloses said spindle guide housing and is preferably open toward the front face of said cutter holder through a guide slit.

22. The device as defined in claim 21, wherein said spindle guide housing includes a guide protrusion extending over its length which is adapted to the cross section of said guide slit.

23. The device as defined in claim 21, wherein said spindle guide housing includes a clamping tongue which is adapted to the cross section of said guide slit.

24. The device as defined in claim 21, wherein said spindle guide housing includes a guide protrusion extending over its length and a clamping tongue which are adapted to the cross section of said guide slit.

25. The device as defined in claim 12, wherein said housing receptacle includes a channel which at least partially encloses said spindle guide housing and is open through a clamping guide groove.

26. The device as defined in claim 25, wherein said spindle guide housing includes a guide protrusion extending over its length which is adapted to the cross section of said clamping guide groove.

27. The device as defined in claim 25, wherein said spindle guide housing includes a clamping tongue which is adapted to the cross section of said clamping guide groove.

28. The device as defined in claim 25, wherein said spindle guide housing includes a guide protrusion extending over its length and a clamping tongue which are adapted to the cross section of said clamping guide groove.

29. The device as defined in claim 12, wherein said housing receptacle includes a channel which at least partially encloses said spindle guide housing and is open toward the front face of said cutter holder through a guide slit and is also open through a clamping guide groove.

30. The device as defined in claim 29, wherein said spindle guide housing includes a guide protrusion extending over its length which is adapted to the cross section of one of said guide slit and clamping guide groove.

31. The device as defined in claim 29, wherein said spindle guide housing includes a clamping tongue which is adapted to the cross section of one of said guide slit and clamping guide groove.

32. The device as defined in claim 29, wherein said spindle guide housing includes a guide protrusion extending over its length and a clamping tongue which are adapted to the cross section of one of said guide slit and clamping guide groove.

33. The device as defined in claim 1, wherein said sliding guide comprises a housing receptacle formed integrally with said cutter holder and adjacent the drive, and wherein said spindle guide housing is secured against rotation in said housing receptacle, and is lockable and displaceable relative to said housing receptacle.

34. The device as defined in claim 33, wherein said housing receptacle includes a channel which at least partially encloses said spindle guide housing and is preferably open toward the front face of said cutter holder through a guide slit.

35. The device as defined in claim 33, wherein said clamping device includes a threaded bore, the front end of which has a friction element, and a rotatable locking knob having a threaded shaft received in said thread bore, and wherein said friction element can be brought into or out of frictional engagement with said spindle guide housing by turning said locking knob, so that the spindle guide housing is clamped in said housing receptacle or is slidable therein.

36. The device as defined in claim 35, wherein said rotatable locking knob comprises a T-screw.

37. The device as defined in claim 35, wherein said friction element is resilient.

38. The device as defined in claim 33, wherein said housing receptacle includes a channel which at least partially encloses said spindle guide housing and is open toward the front face of said cutter holder through a guide slit and is also open through a clamping guide groove, wherein said spindle guide housing includes a guide protrusion extending over its length and a clamping tongue which are adapted to the cross section of one of said guide slit and clamping guide groove, wherein said clamping tongue has a clamping counter-surface, wherein said clamping device includes said clamping guide groove, a clamping screw, and a clamping element, and wherein the clamping tongue is angularly disposed with respect to said guide protrusion, said clamping counter-surface extends parallel to said front face and is fittedly guided in the clamping guide groove and can be clamped by means of said clamping screw, said clamping screw acting directly or through the interposition of said clamping element on the clamping counter-surface.

39. The device as defined in claim 38, wherein said sliding guide includes a fastening bore having said clamping screw screwed therein, said fastening bore extends vertically to said front face, provided at one side of the clamping guide groove, and opens in a contact surface offset back from and parallel to said front face, the offset being such that the clamping counter-surface of said clamping tongue defines a clamping distance with respect to said contact surface, and wherein a clamping surface, formed on the underside of the head of said clamping screw or on said interposed clamping element, can be brought in or out of engagement with said clamping counter-surface thereby clamping or releasing said clamping tongue in said clamping guide groove, by turning of said clamping screw.

40. The device as defined in claim 39, wherein said clamping element comprises a clamping disk, said clamping disk being fastened on said contact surface by said clamping screw, and being provided with said clamping surface.

41. The device as defined in claim 38, wherein said clamping device further includes a clamping lever integrally made of one piece with said clamping screw.

42. The device as defined in claim 38, wherein the lead of the thread of said clamping screw is selected such that said clamping screw can be brought into a clamping position by rotating it half a turn and out of the clamping position, which assures the displacement of said spindle guide housing in said housing receptacle, by rotating it half a turn.

43. The device as defined in claim 34, wherein said spindle guide housing includes a guide protrusion extending over its length which is adapted to the cross section of said guide slit.

44. The device as defined in claim 34, wherein said spindle guide housing includes a clamping tongue which is adapted to the cross section of said guide slit.

45. The device as defined in claim 34, wherein said spindle guide housing includes a guide protrusion extending over its length and a clamping tongue which are adapted to the cross section of said guide slit.

46. The device as defined in claim 33, wherein said housing receptacle includes a channel which at least partially encloses said spindle guide housing and is open through a clamping guide groove.

47. The device as defined in claim 46, wherein said spindle guide housing includes a guide protrusion extending over its length which is adapted to the cross section of said clamping guide groove.

48. The device as defined in claim 46, wherein said spindle guide housing includes a clamping tongue which is adapted to the cross section of said clamping guide groove.

49. The device as defined in claim 46, wherein said spindle guide housing includes a guide protrusion extending over its length and a clamping tongue which are adapted to the cross section of said clamping guide groove.

50. The device as defined in claim 33, wherein said housing receptacle includes a channel which at least partially encloses said spindle guide housing and is open toward the front face of said cutter holder through a guide slit and is also open through a clamping guide groove.

51. The device as defined in claim 50, wherein said spindle guide housing includes a guide protrusion extending over its length which is adapted to the cross section of one of said guide slit and clamping guide groove.

52. The device as defined in claim 50, wherein said spindle guide housing includes a clamping tongue which is adapted to the cross section of one of said guide slit and clamping guide groove.

53. The device as defined in claim 50, wherein said spindle guide housing includes a guide protrusion extending over its length and a clamping tongue which are adapted to the cross section of one of said guide slit and clamping guide groove.

54. The device as defined in claim 1, wherein the spindle guide housing includes a hollow cylinder basic body having an inner thread for the threaded spindle.

55. The device as defined in claim 54, further comprising:
   a distance indicator device mounted to said spindle guide housing for indicating the axial displacement position of the threaded spindle within the spindle guide housing, said distance indicator device having a housing formed integrally on the outer, upper surface of said basic body, wherein said sliding guide comprises a housing receptacle and said housing receptacle includes a channel which is open toward the front face of said cutter holder through a guide slit, and wherein said spindle guide housing has a cutout which extends at the center and across the longitudinal axis of said basic body around which said distance indicator device housing is developed and is disposed extending through said guide slit and outside of said channel.

56. The device as defined in claim 1, wherein said stop pin forms one end of said threaded spindle, the length of which corresponds at least to the maximum feed distance of said threaded spindle in said spindle guide housing.

57. The device as defined in claim 1, further comprising:
    a scale on said spindle guide housing for indicating the vertical distance position in relation to said bit stop.

58. The device as defined in claim 1, further comprising:
    an adjustment element for axially adjusting said threaded spindle.

59. The device as defined in claim 58, wherein said adjustment element comprises a knurled knob which extends from an upper front surface of said spindle guide housing, and wherein turning of said knob effects said axial adjustment.

* * * * *